Patented June 11, 1946

2,401,898

UNITED STATES PATENT OFFICE 2,401,898

ALKALI-RESISTANT BINDER

Isidor M. Bernstein, Brooklyn, N. Y., assignor, by mesne assignments, to H. D. Roosen Company Inc., Brooklyn, N. Y., a corporation of Delaware No Drawing. Application September 13, 1943,
Serial No. 502,194

6 Claims. (Cl. 260—23)

This invention relates to soap wrapper ink vehicles or the like which must be resistant to the free alkali of the soap and must have ability to resist the detergent and saponifying action of the moist soap itself, and more particularly to a novel and improved binder for use in such vehicles. The binder is also useful as an oxidizable coating, as a linoleum filler or binder, or, in general, where an alkali resistant coating composition is required.

An object of the invention is to provide a binder of the above type having novel and improved characteristics.

Another object is to provide a binder which improves the resistance qualities of the dried film of the vehicle in which it is incorporated.

Various other objects and advantages will be apparent as the nature of the invention is more fully disclosed.

It has long been known that the dried films of China-wood oil-para phenyl phenol formaldehyde resin vehicles possess excellent alkali and soap resistance. Chlorinated rubber dispersed in a suitable solvent has also been successfully used. However, due to the present shortage of these materials, it has become very difficult to produce soap resisting vehicles of good quality.

Unsaponifiable resins have heretofore been used as diluents in ink vehicles, but these resins did not add to the inherent soap resistance of the dried film of the vehicle in which they were present.

In accordance with the present invention, I have found that various unsaponifiable resins such as coumarone and indene resins, when dissolved in certain hereinafter specified resin modified drying oils, which have been found to be solvents for such resins in both the hot and cold state, form a binder having improved soap resistance characteristics.

A resin modified drying oil suitable for this purpose comprises the esterification products of a drying oil fatty acid and a resin acid when esterified with purified polyethers of pentaerythritol higher than the di-ether from which gel-forming constituents have been removed. The products may comprise the co-ester or a mixture of the esters of said polyethers when esterified separately with a drying oil fatty acid and with a resin acid.

The polyethers of pentaerythritol higher than the di-ether may be obtained in accordance with the process set forth in my co-pending application Ser. No. 428,384, filed January 27, 1942, which discloses a method for removing the gel forming constituents from a mixture of such polyethers by means of an acidified solvent. Such purified polyethers from which the di-ether and the gel forming constituents have been removed will be referred to hereinafter for convenience as "purified polypentek."

The purified polypentek may be esterified with a drying oil fatty acid or a semi-drying oil fatty acid, such as that of China-wood oil, perilla oil, linseed oil, dehydrated castor oil or soya bean oil to form a drying oil ester of purified polypentek. It may also be esterified with a resin acid, such as rosin, or a natural "run" or heat depolymerized resin to form a resin ester of purified polypentek. A mixture of these two esters constitutes the resin-modified drying oil referred to above and has been found to be a solvent for such unsaponifiable resins when in both the hot and the cold state. Hence the latter resins may be dissolved in said resin modified drying oil and will remain in solution in the film after the latter has set and dried.

Instead of esterifying the purified polypentek with the drying oil fatty acid and with the resin acid separately and forming a mixture thereof, the esterification may be effected simultaneously, in which event, a co-ester is formed which has been found to have properties similar to the mixed ester above mentioned. This co-ester or mixed ester is referred to herein for convenience as the esterification products of the above substances.

The drying oil fatty acid ester of purified polypentek, by itself, possesses certain soap resistant qualities but is not suitable for use with the coumarone or indene resins because of the insolubility of such resins in the ester when cold, which is a characteristic peculiar to this ester. The co-ester or mixed ester above specified, however, avoids this difficulty and holds such resins in solution even when cold.

Examples of the above esterification products and methods of making the same are set forth in my co-pending application 428,384, above mentioned.

The following are examples of binders embodying the present invention:

*Example 1*

| | Parts |
|---|---|
| Rosin | 8.32 |
| Linseed fatty acids | 17.17 |
| Purified polypentek | 4.20 |
| Decolorizing carbon | 0.51 |
| Mineral spirits (boiling range 152° C.–207° C.) | 1.01 |

Esterify at 530° F. until acid value has decreased to approximately 6. This will give: Co-ester of rosin and linseed oil fatty acid with purified polypentek.

Add and dissolve therein: 28.33 parts coumarone, and/or indene resins.

Example 2

| | Parts |
|---|---|
| Drying or semi-drying oil esterification product of purified polypentek | 18.92 |
| Rosin or "run" natural resin esterification product of purified polypentek | 9.41 |

Dissolve therein: 28.33 parts coumarone and/or indene resins.

Example 3

| | Parts |
|---|---|
| "Run" Congo (70–80 acid value) | 7.83 |
| Purified polypentek | 3.95 |
| Linseed fatty acids | 22.42 |
| Decolorizing carbon | 0.48 |
| Mineral spirits | 0.96 |

Esterify at 530° F. until acid value has decreased to approximately 6. This will give: Co-ester of Congo and linseed oil fatty acid with purified polypentek.

Dissolve therein: 26.60 parts coumarone and/or indene resins.

The binder produced in accordance with the above examples comprises a plastic, thick, gummy mass. This binder may be useful as such as a linoleum filler or an oxidizable coating material, or may be dissolved in a solvent to form a vehicle. Such a solvent may comprise a petroleum solvent or other organic solvent.

As a specific example, a mixture of binder and petroleum solvent having a boiling range of 450° F. to 750° F. containing from 40% to 50% of solvent is suitable for use as a printing ink vehicle.

A pigment such as carbon black or a suitable colored pigment may be incorporated in this vehicle in the usual manner to form a printing ink having the soap resistant qualities outlined above. Obviously, the vehicle may also be used as a varnish, paint, or other coating composition.

Although certain specific embodiments have been set forth by way of example, it is to be understood that the invention is not to be restricted thereto, but is only to be limited in accordance with the scope of the following claims.

What is claimed is:

1. An oxidizable binder comprising a resin selected from the group consisting of the coumarone and indene resins dissolved in a resin modified drying oil comprising the esterification products of polyethers of pentaerythritol higher than the di-ether with a drying oil fatty acid and a resin acid, the resin modified drying oil being present in a proportion suited to form a stable solution of the resins when cold.

2. An oxidizable binder comprising a resin selected from the group consisting of the coumarone and indene resins, dissolved in a resin modified drying oil comprising the co-ester of polyethers of pentaerythritol higher than the di-ether with a drying oil fatty acid and a resin acid, the resin modified drying oil being present in a proportion suited to form a stable solution of the resins when cold.

3. An oxidizable binder comprising a resin selected from the group consisting of the coumarone and indene resins, dissolved in a resin modified drying oil comprising a mixed ester consisting of the esterification product of polyethers of pentaerythritol higher than the di-ether and a drying oil fatty acid and the esterification product of polyethers of pentaerythritol higher than the di-ether and a resin acid, the resin modified drying oil being present in a proportion suited to form a stable solution of the resins when cold.

4. An oxidizable binder comprising a resin selected from the group consisting of the coumarone and indene resins, dissolved in a resin modified drying oil comprising the esterification products of polyethers of pentaerythritol higher than the di-ether with rosin and linseed oil fatty acid, the resin modified drying oil being present in a proportion suited to form a stable solution of the resins when cold.

5. A printing ink vehicle comprising a solvent having dissolved therein a binder comprising a resin selected from the group consisting of the coumarone and indene resins, dissolved in a resin modified drying oil comprising the esterification products of polyethers of pentaerythritol higher than the di-ether with a drying oil fatty acid and a resin acid, the resin modified drying oil being present in a proportion suited to form a stable solution of the resins when cold.

6. A printing ink comprising a solvent having dissolved therein a pigment and a binder, said binder comprising a resin selected from the group consisting of the coumarone and indene resins, dissolved in the esterification products of polyethers of pentaerythritol higher than the di-ether with a drying oil fatty acid and a resin acid, the resin modified drying oil being present in a proportion suited to form a stable solution of the resins when cold.

ISIDOR M. BERNSTEIN.